United States Patent
Jotshi et al.

(10) Patent No.: US 10,728,769 B1
(45) Date of Patent: Jul. 28, 2020

(54) MULTI-STAGE OBJECT DETECTION AND CATEGORIZATION OF ANTENNA MOUNT LOCATIONS

(71) Applicant: AT&T Intellectual Property I, L.P., Atlanta, GA (US)

(72) Inventors: Arun Jotshi, Parsippany, NJ (US); Amit Rathod, Hillsborough, NJ (US); Gaurav Thakur, Matawan, NJ (US); Suchitra Krishnaswamy, San Ramon, CA (US); Shang Li, Aberdeen, NJ (US); Kathleen Meier-Hellstern, Cranbury, NJ (US); Manish Shah, Hillsborough, NJ (US); Martin Suchara, Woodridge, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/427,760

(22) Filed: May 31, 2019

(51) Int. Cl.
| | |
|---|---|
| *H04W 16/18* | (2009.01) |
| *G06K 9/62* | (2006.01) |
| *G06K 9/46* | (2006.01) |
| *H04B 17/27* | (2015.01) |

(52) U.S. Cl.
CPC .......... *H04W 16/18* (2013.01); *G06K 9/4604* (2013.01); *G06K 9/6215* (2013.01); *H04B 17/27* (2015.01)

(58) Field of Classification Search
CPC ..... H04B 17/27; H04B 17/318; H04W 16/18; H04W 64/003; G06K 9/4604; G06K 9/6215; G06T 17/05; G06T 7/70; G06T 17/00; G06T 7/001; G01C 11/06; H01Q 1/24
See application file for complete search history.

(56) References Cited

U.S. PATENT DOCUMENTS 9,736,649 B1 * 8/2017 Do ........................... H01Q 1/24

OTHER PUBLICATIONS

Zhang et al., "Using Deep Learning to Identify Utility Poles with Crossarms and Estimate Their Locations from Google Street View Images", Aug. 2018, 21 Pages (Year: 2018).*
Fukano et al. "Detection and Classification of Pole-Like Objects From Mobile Mapping Data", 2015, 8 pages (Year: 2015).*

(Continued)

*Primary Examiner* — Quoc Thai N Vu
(74) *Attorney, Agent, or Firm* — Guntin & Gust, PLC; Mark Wilinski

(57) ABSTRACT

Aspects of the disclosure include determining that a first instance of a first object is present in a first image in accordance with an execution of a first image processing algorithm, generating a first bounding region that at least partially surrounds the first instance of the first object in the first image, determining that the first instance of the first object in the first image has a first attribute in accordance with an execution of a second image processing algorithm, wherein the second image processing algorithm is operative on the first image in accordance with the first bounding region, and selecting the first instance of the first object and/or a second instance of the first object to receive a deployment of a network resource in accordance with the determining that the first instance of the first object in the first image has the first attribute. Other aspects are disclosed.

20 Claims, 10 Drawing Sheets

(56) References Cited

OTHER PUBLICATIONS

Cheng et al., "Power Pole Detection Based on Graph Cut", 2008, 5 pages (Year: 2008).*
Sharma, et al., "Image Analysis-based Automatic Utility Pole Detection for Remote Surveillance", 2015, 7 pages (Year: 2015).*
A Keras port of Single Shot MultiBox Detector, https://github.com/pierluigiferrari/ssd_keras, May 9, 2019, pp. 1-8.
Liu, Wei et al., SSD: Single Shot MultiBox Detector, arXiv:1512.02325v5 [cs.CV] Dec. 29, 2016, pp. 1-17.

* cited by examiner

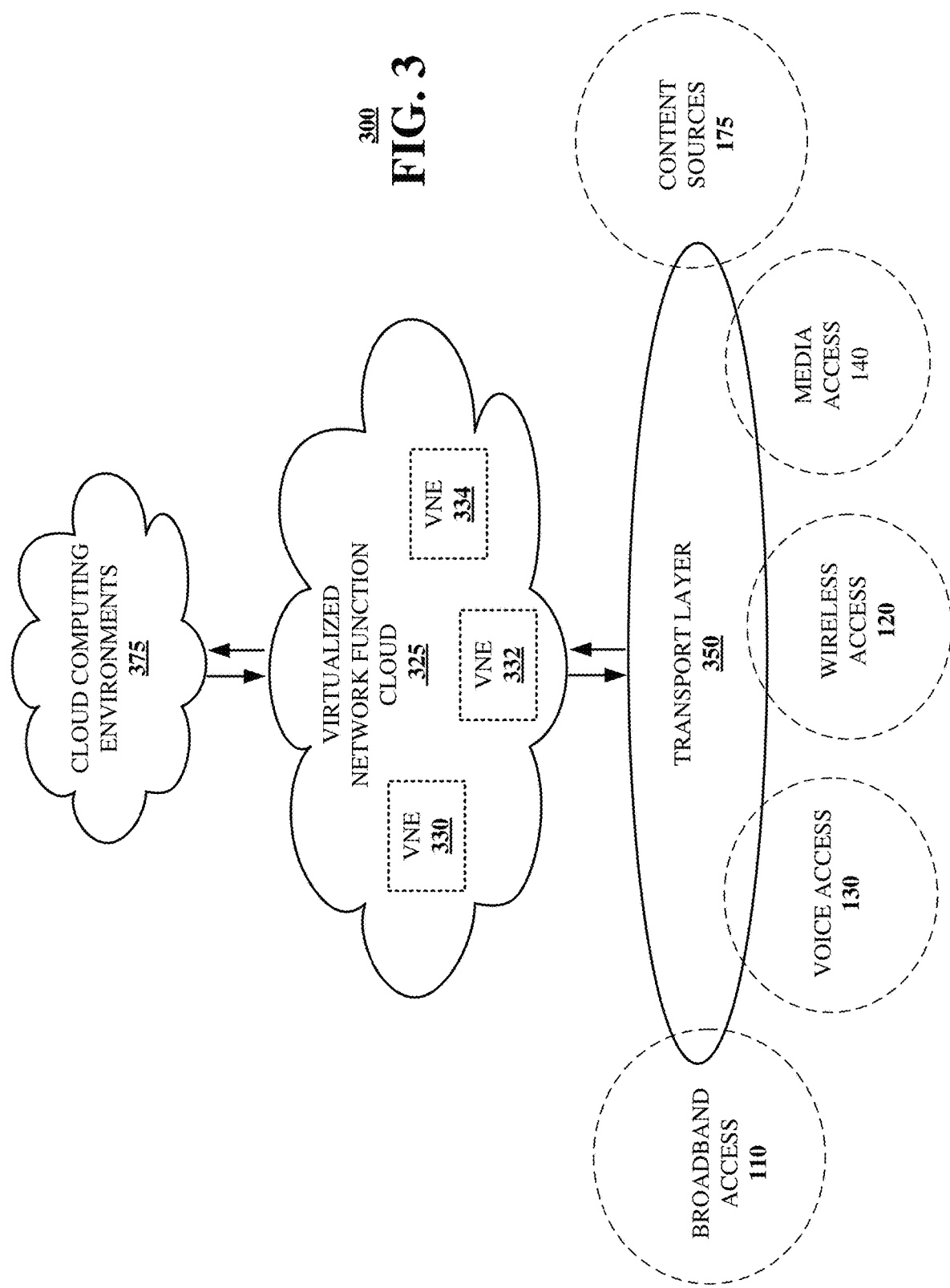

US 10,728,769 B1

MULTI-STAGE OBJECT DETECTION AND CATEGORIZATION OF ANTENNA MOUNT LOCATIONS

FIELD OF THE DISCLOSURE

The subject disclosure relates to a multi-stage object detection and categorization of antenna mount locations.

BACKGROUND

As the world continues to become increasingly connected over vast/various communication networks, network/service operators/providers are continuously confronted with the challenge of providing efficient, high-quality service to users/devices. For example, as a network/service operator seeks to implement additional resources to support an existing network, or is providing resources in the first instance (such as during an initial deployment of a given, new network), technicians/site surveyors are dispatched to identify candidate locations/objects (e.g., utility poles) that will best serve as a host site of the resources. Reports/Data prepared/gathered by the technicians are subsequently reviewed/analyzed by, e.g., engineers to ultimately select a location/object from the candidate locations/objects. Thus, the identification/selection of a location/object is time and labor intensive and is susceptible to error (e.g., is susceptible to misinterpretation or miscommunication between technicians and engineers), potentially resulting in costly rework and increased product/service development cycle times. Still further, the reports/data may potentially miss/overlook/ignore information, such that a selected candidate location might not be the optimum location. As a result, the service that is obtained/provided by the resources when deployed/implemented may be sub-optimal in some instances.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
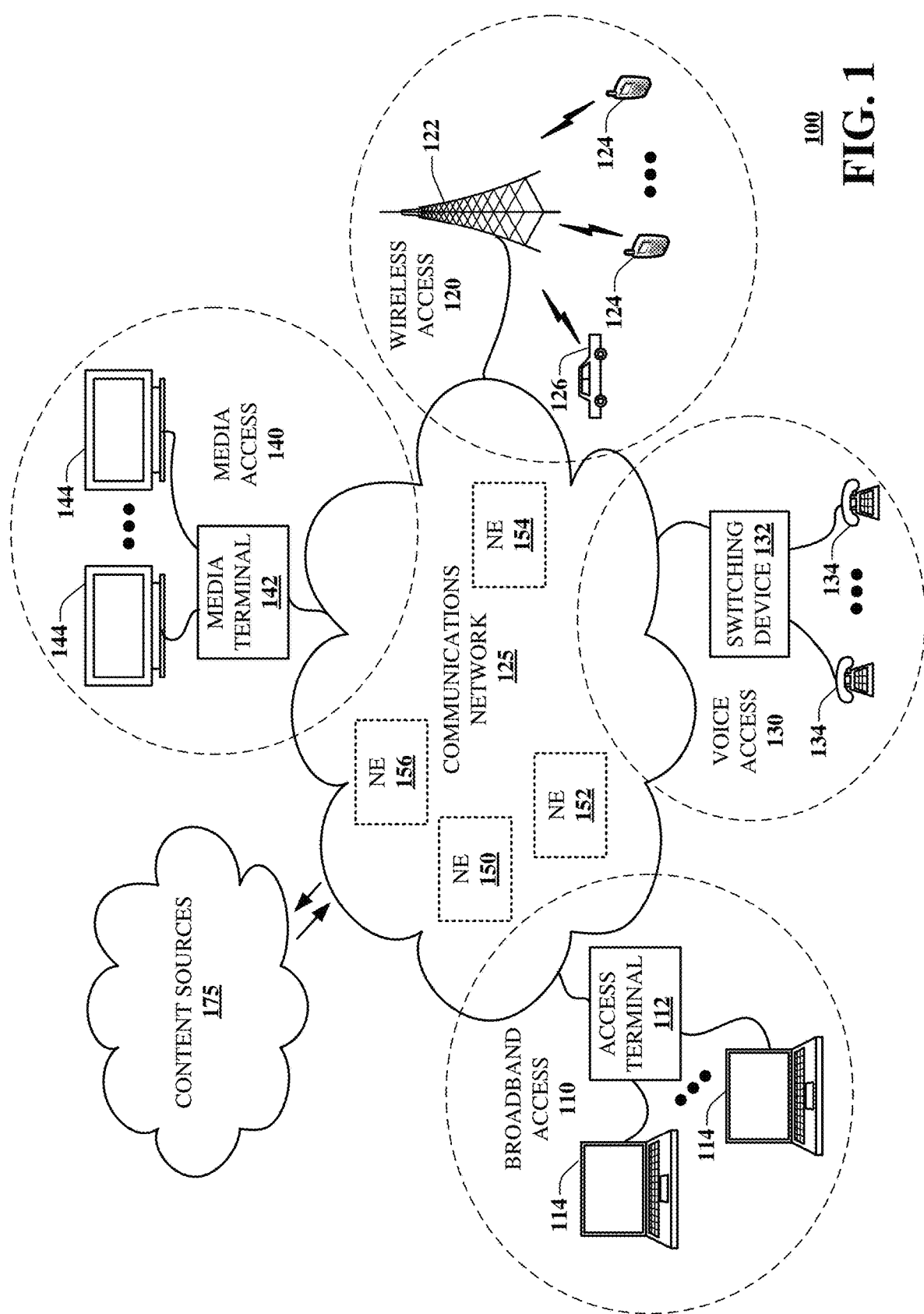
FIG. 1 is a block diagram illustrating an exemplary, non-limiting embodiment of a communications network in accordance with various aspects described herein.

The subject disclosure describes, among other things, illustrative embodiments for selecting an object for receiving a deployment of a resource in accordance with a processing of one or more images. Other embodiments are described in the subject disclosure.

One or more aspects of the subject disclosure include obtaining an image that is sourced from a vehicle, identifying a first plurality of characteristics in the image, comparing the first plurality of characteristics to a second plurality of characteristics associated with a plurality of objects to generate a first score, determining that a first match exists based on a comparison of the first score to a first threshold, responsive to the determining that the first match exists, identifying a first object of the plurality of objects as being present in the image, identifying a third plurality of characteristics in the image based on a processing of the image in accordance with a first bounding region that surrounds the first object in the image, comparing the third plurality of characteristics to a plurality of attributes to generate a second score, determining that a second match exists based on a comparison of the second score to a second threshold, responsive to the determining that the second match exists, identifying a first attribute of the plurality of attributes as being present in the first object, and selecting the first object or a second object of the plurality of objects to receive a deployment of a communication network resource in accordance with the identifying of the first object and the identifying of the first attribute.

One or more aspects of the subject disclosure include obtaining a first plurality of images, identifying a first plurality of characteristics in the first plurality of images, determining that a first match exists based on a comparison of the first plurality of characteristics to a second plurality of characteristics associated with a plurality of objects, responsive to the determining that the first match exists, identifying a first object, a second object, or a combination thereof, as being present in the first plurality of images, resulting in at least one identified object, identifying a third plurality of characteristics in the first plurality of images based on a processing of the first plurality of images in accordance with a bounding region that at least partially surrounds the at least one identified object, determining that a second match exists based on a comparison of the third plurality of characteristics to a plurality of attributes, responsive to the determining that the second match exists, identifying a first attribute of the plurality of attributes as being present in the at least one identified object, and selecting the at least one identified object to receive a deployment of a first resource in accordance with the identifying of the at least one identified object and the identifying of the first attribute.

One or more aspects of the subject disclosure include determining that a first instance of a first object is present in a first image in accordance with an execution of a first image processing algorithm, responsive to the determining that the first instance of the first object is present in the first image, generating a first bounding region that at least partially surrounds the first instance of the first object in the first image, determining that the first instance of the first object in the first image has a first attribute in accordance with an execution of a second image processing algorithm, wherein the second image processing algorithm is operative on the first image in accordance with the first bounding region, and selecting the first instance of the first object, a second instance of the first object, or a combination thereof, to receive a deployment of a network resource in accordance with the determining that the first instance of the first object in the first image has the first attribute.

Referring now to FIG. 1, a block diagram is shown illustrating an example, non-limiting embodiment of a communications network 100 in accordance with various aspects described herein. For example, communications network 100 can facilitate in whole or in part obtaining an image that is sourced from a vehicle, identifying a first plurality of characteristics in the image, comparing the first plurality of characteristics to a second plurality of characteristics associated with a plurality of objects to generate a first score, determining that a first match exists based on a comparison of the first score to a first threshold, responsive to the determining that the first match exists, identifying a first object of the plurality of objects as being present in the image, identifying a third plurality of characteristics in the image based on a processing of the image in accordance with a first bounding region that surrounds the first object in the image, comparing the third plurality of characteristics to a plurality of attributes to generate a second score, determining that a second match exists based on a comparison of the second score to a second threshold, responsive to the determining that the second match exists, identifying a first attribute of the plurality of attributes as being present in the first object, and selecting the first object or a second object of the plurality of objects to receive a deployment of a communication network resource in accordance with the identifying of the first object and the identifying of the first attribute. Communications network 100 can facilitate in whole or in part obtaining a first plurality of images, identifying a first plurality of characteristics in the first plurality of images, determining that a first match exists based on a comparison of the first plurality of characteristics to a second plurality of characteristics associated with a plurality of objects, responsive to the determining that the first match exists, identifying a first object, a second object, or a combination thereof, as being present in the first plurality of images, resulting in at least one identified object, identifying a third plurality of characteristics in the first plurality of images based on a processing of the first plurality of images in accordance with a bounding region that at least partially surrounds the at least one identified object, determining that a second match exists based on a comparison of the third plurality of characteristics to a plurality of attributes, responsive to the determining that the second match exists, identifying a first attribute of the plurality of attributes as being present in the at least one identified object, and selecting the at least one identified object to receive a deployment of a first resource in accordance with the identifying of the at least one identified object and the identifying of the first attribute. Communications network 100 can facilitate in whole or in part determining that a first instance of a first object is present in a first image in accordance with an execution of a first image processing algorithm, responsive to the determining that the first instance of the first object is present in the first image, generating a first bounding region that at least partially surrounds the first instance of the first object in the first image, determining that the first instance of the first object in the first image has a first attribute in accordance with an execution of a second image processing algorithm, wherein the second image processing algorithm is operative on the first image in accordance with the first bounding region, and selecting the first instance of the first object, a second instance of the first object, or a combination thereof, to receive a deployment of a network resource in accordance with the determining that the first instance of the first object in the first image has the first attribute.

In particular, in FIG. 1 a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
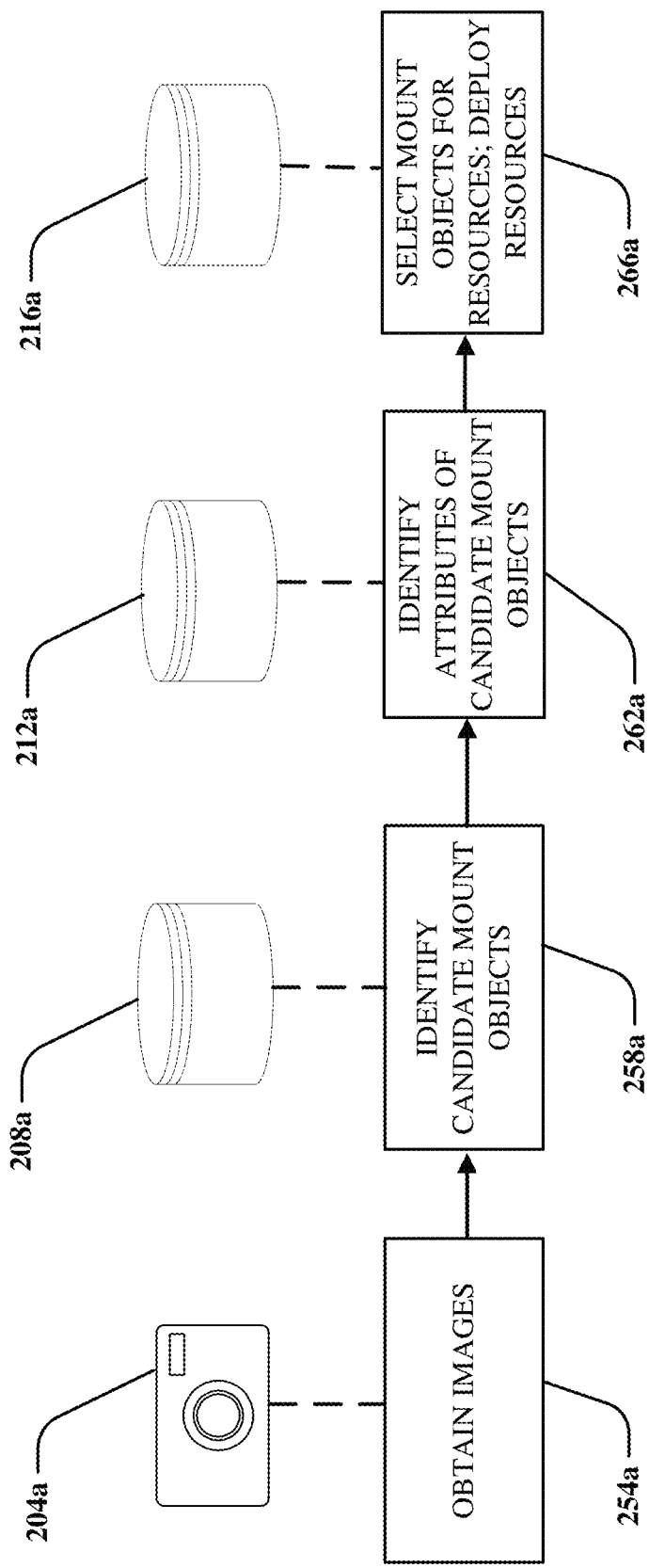
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200a functioning within, or operatively overlaid upon, the communication network 100 of FIG. 1 in accordance with various aspects described herein. In some embodiments, aspects of the system 200a may be at least partially implemented in hardware, software, firmware, or any combination thereof. As described in further detail below, the system 200a may be implemented/utilized to identify mount locations for receiving/deploying/placing one or more resources, such as for example communication network resources.

The system 200a may incorporate various types/kinds of image capture equipment, illustratively depicted as a camera 204a in FIG. 2A. For example, the image capture equipment 204a may include a vehicle, such as an aircraft (e.g., fixed-wing aircraft, rotary aircraft, etc.), a spacecraft (e.g., satellites), a motor vehicle (e.g., a car, a truck, a bus, an all-terrain vehicle etc.), a train/railcar/locomotive, a marine craft (e.g., a boat, a ship, a ferry, a yacht, etc.), a bicycle, etc. In some embodiments, the image capture equipment 204a may include user equipment (UE)/client devices, such as for example handheld cameras, mobile devices (e.g., smartphones), etc.

As depicted via reference character/block 254a, one or more images may be obtained from the image capture equipment 204a. For example, as part of block 254a, the images may be obtained directly from the image capture equipment 204a and/or may be obtained indirectly from the image capture equipment 204a via one or more third-party sites/service/devices. In the context of the vehicular image capture equipment described above, the images may be captured when the vehicle is at rest/on the ground and/or when the vehicle is in operation/deployed (e.g., in motion). The images may be captured/oriented at various angles or perspectives, such as for example an overhead perspective, a street-side or street-view perspective, etc.

Once the images are obtained (block 254a), the images may be processed to identify one or more potential/candidate locations/objects for receiving/deploying/placing/mounting one or more resources as represented by block 258a. For example, the processing of the images may be performed in accordance with one or more algorithms. The algorithms may include one or more image processing algorithms. The algorithms may incorporate aspects of machine learning (ML), artificial intelligence (AI), and/or deep learning (DL). To facilitate an execution of the algorithms, data may be sourced/obtained from a data storage 208a (e.g., a computer-readable medium, a memory, a database, etc.).

The data included in the data storage 208a may correspond to a profile or specification of known objects that may be used for mounting resources, such as for example streetlights, utility/telephone poles, ornate/decorative/historical poles, towers (e.g., communication towers), structures of buildings (e.g., trusses, pilings, etc.), etc. In this respect, the processing performed as part of block 258a (which may incorporate aspects of the method 258b of FIG. 2B) may include identifying characteristics/parameters of/in the images of block 254a (see FIG. 2B: block 258b-1), and then comparing the identified characteristics/parameters with characteristic/parameters of the objects represented by the data of the data storage 208a (see FIG. 2B: block 258b-5).

In some embodiments, as part of block 258a of FIG. 2A (see FIG. 2B: block 258b-5), one or more scores may be generated. The scores may be representative of the degree/extent to which an object included in the images of block 254a match the profile/specification of the objects represented in the data of the data storage 208a in accordance with the comparison. As an illustrative example, on a scale of 0.00 to 1.00 a score of 1.00 may represent an exact match, whereas a score of 0.00 may represent a complete lack of a match. Other scoring scales/rankings may be used in some embodiments. A threshold may be generated/established as part of identifying whether a match exists (e.g., the "yes" path out of block 258b-7 of FIG. 2B). To continue the above example incorporating scoring on a scale from 0.00 to 1.00, and assuming that a threshold of 0.90 is used, scores (equal to or) above 0.90 may be declared a match, whereas scores (equal to or) less than 0.90 may be declared as not being a match (e.g., may be declared as a lack of a match).

Figure 2B:
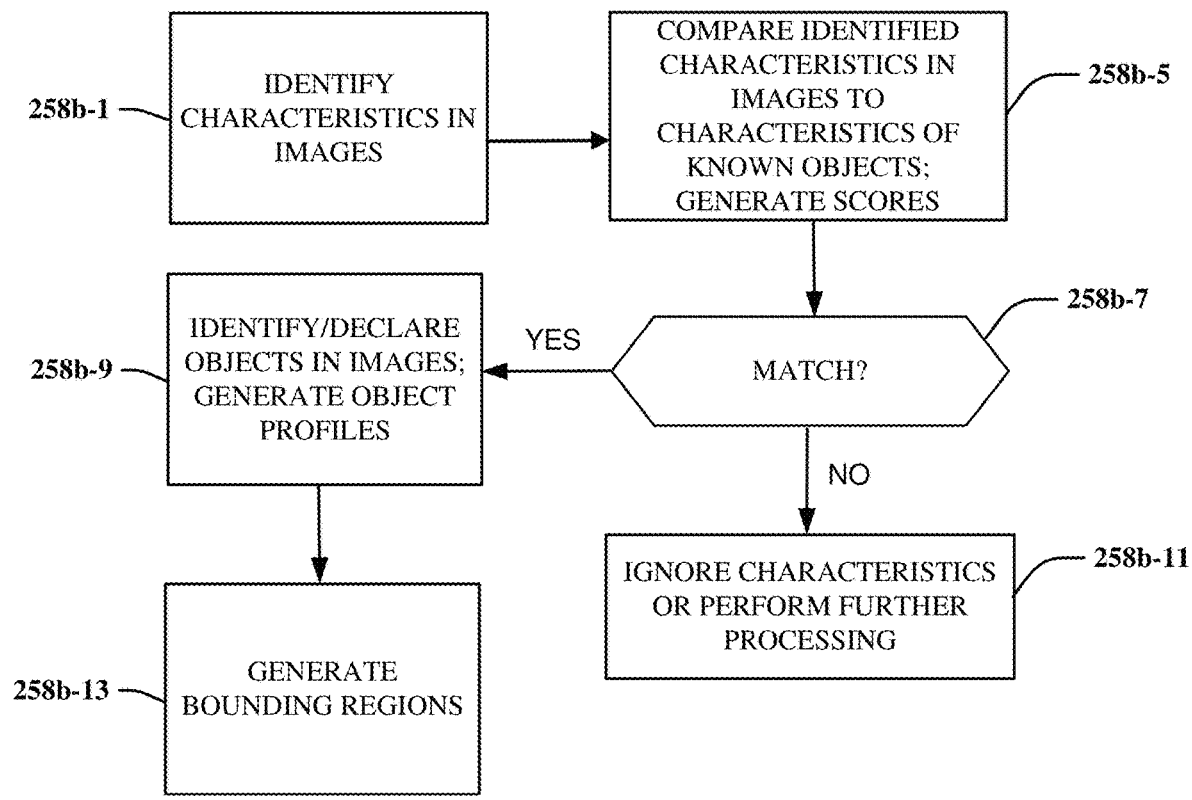
FIG. 2B depicts an illustrative embodiment of a method in accordance with various aspects described herein.

If the comparison yields an exact match or a similar match (e.g., a match in an amount that is greater than a threshold) (see FIG. 2B: block 258b-7), then the characteristics of the images may be identified/declared as the object represented by the data of the data storage 208a (see FIG. 2B: block 258b-9). On the other hand, if there is no such match based on the comparison, the characteristics of the images may be ignored and/or subjected to additional processing as needed/desired (see FIG. 2B: block 258b-11).

As part of block 258b-9 of FIG. 2B, one or more profiles may be established/generated for the identified/declared objects. Such profiles may be stored in/by, e.g., the data storage 208a of FIG. 2A.

In some embodiments, the processing performed as part of block 258a may be based on (e.g., may be supplemented via) geo-tagged coordinates (e.g., latitude and longitude). For example, metadata appended to the images of block 254a may include an identification of a geographical location of the subject matter of the images. In this respect, the data of the data storage 208a may identify objects on the basis of geographical data. Thus, in some embodiments the comparison described above in conjunction with, e.g., block 258b-5 of FIG. 2B may be based on location/coordinate data/characteristics. For example, the comparison may entail looking up an identification of an object in a look-up table stored by the data storage 208a, where the location/coordinate data specified by the metadata of the images may serve as an index into the look-up table.

Figure 2C:
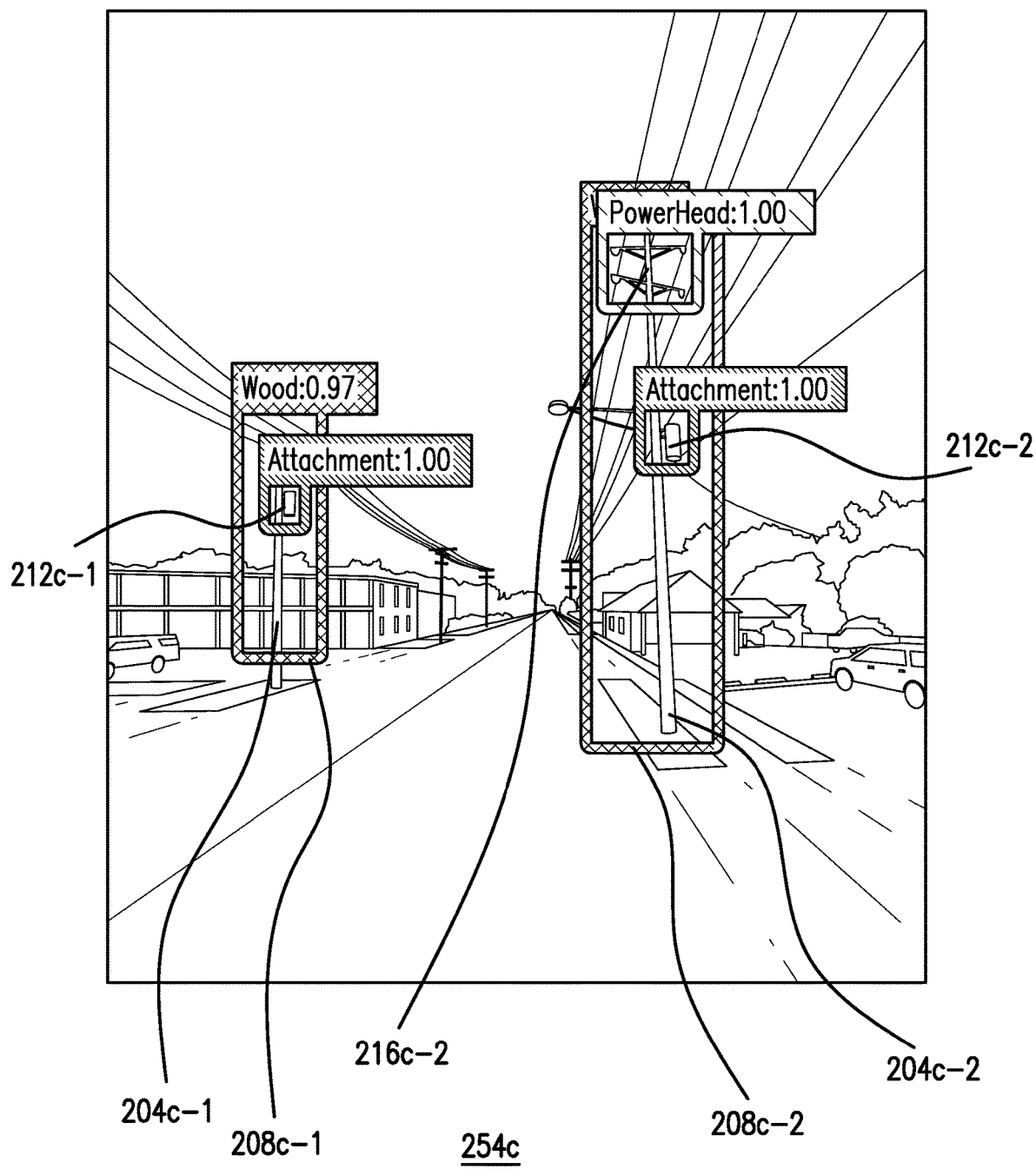
FIG. 2C depicts an example of an image that is processed to identify objects and attributes of the objects in accordance with various aspects described herein.

Referring now to FIG. 2C, an example of an image 254c (which may be included as part of the images of block 254a of FIG. 2A) is shown. The processing of the image 254c in accordance with the description set forth above (e.g., in accordance with block 258a of FIGS. 2A-2B) may serve to identify two potential/candidate objects for mounting a resource—namely, a first object 204c-1 (e.g., a first pole) and a second object 204c-2 (e.g., a second pole). As shown in FIG. 2C (see also FIG. 2B: block 258b-13), the first object 204c-1 and the second object 204c-2 may be included/ contained within a first bounding region 208c-1 and a second bounding region 208c-2, respectively.

While the bounding regions 208c-1 and 208c-2 are shown in FIG. 2C as being (substantially) box-like or rectangular in shape, other shapes (e.g., regular shapes and/or irregular shapes) may be used in some embodiments. Use of regular shapes may simplify subsequent processing discussed below, at the potential expense of including extraneous/ unnecessary detail. Accordingly, one skilled in the art will appreciate that trade-offs may be made in accordance with one or more application requirements.

In some embodiments, the scores of, e.g., block 258b-5 of FIG. 2B may influence a shape and/or size of the bounding regions 208c-1 and 208c-2. For example, if the score is indicative of a close/strong match, the bounding region may be made smaller and conform more closely to the profile of the respective object than if the score is indicative of a far/weak match.

The bounding regions 208c-1 and 208c-2 may be identified/generated as a result of the processing of block 258a of FIG. 2A. For reasons that will become clearer in the description below, the identification/recognition of the objects 204c-1 and 204c-2 and/or the identification/generation of the bounding regions 208c-1 and 208c-2 may serve as a first-stage of a filter with respect to the image 254c.

Having identified the candidate objects (e.g., objects 204c-1 and 204c-2 of FIG. 2C) (and respective bounding regions [e.g., bounding regions 208c-1 and 208c-2 of FIG. 2C]) for receiving/mounting a resource in conjunction with the processing of block 258a described above, additional processing may be performed with respect to such candidate objects/bounding regions as represented by block 262a of FIG. 2A. As the nomenclature implies, the processing of block 262a may be bounded by/limited to the bounding regions, which is to say that the processing of block 262a may effectively ignore/discard of image data that is outside of/external to the bounding regions. Ignoring/discarding of such data may help to eliminate noise that may be present in an image (e.g., the image 254c of FIG. 2C). Referring to FIG. 2A and FIG. 2C, and in view of the disclosure above, the processing performed in block 262a may represent a second-stage of the filter with respect to the image 254c.

The processing of block 262a may be performed in accordance with one or more algorithms, such as for example one or more image processing algorithms. The processing/algorithms of block 262a may incorporate aspects of ML, AI, and/or DL. The processing of block 262a may serve to identify attributes of the candidate objects, in accordance with data contained within/stored by a data storage 212a. The data storage 212a may correspond to the data storage 208a, which is to say that a common housing/ storage device may be used in some embodiments.

Figure 2D:
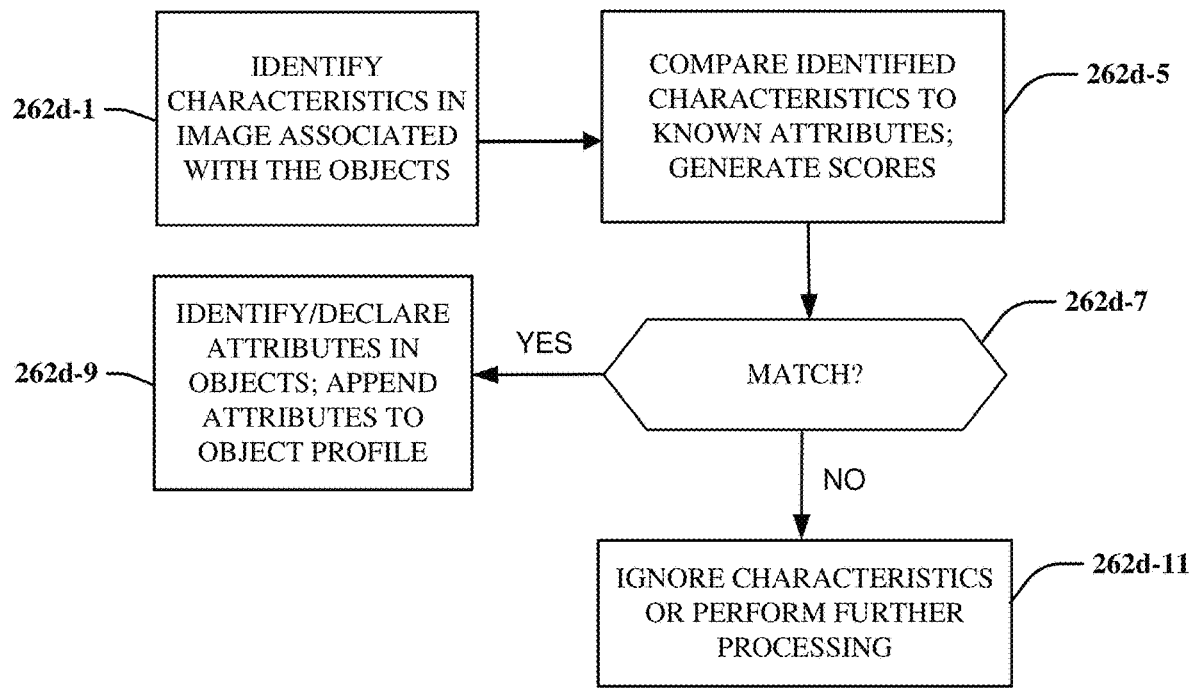
FIG. 2D depicts an illustrative embodiment of a method in accordance with various aspects described herein.

Referring to FIG. 2A and FIG. 2D, the processing performed as part of block 262a may incorporate aspects of the method 262d. In block 262d-1, characteristics in/of/associated with an object in an image may be identified. To demonstrate, and taking the object 204c-1 of FIG. 2C as an example, a dimension (e.g., a height, a diameter, a circumference, etc.) of the object 204c-1 may be identified. If the image 254c contains/exhibits a sharp contrast (e.g., a large gradient) proximate to the object 204c-1 (e.g., within a threshold distance of the object 204c-1), such a condition may be noted as part of block 262d-1; this condition may be indicative of a large amount of light (e.g., sunlight) reflecting off of the object 204c-1, such that it may be inferred that the object 204c-1 is made of metal. Conversely, the lack of such a sharp contrast/gradient proximate the object 204c-1 in the image 254c may be indicative of the object 204c-1 absorbing a large portion of the light—e.g., not being made of metal (e.g., being made of wood). Still further, a sharp gradient (or lack thereof) may be indicative of equipment (e.g., utility equipment), signage (e.g., road/highway signs), traffic signals (e.g., traffic lights, cross-walk signals), etc., such as for example an attachment mechanism 212c-1 of FIG. 2C, that may be present on the object 204c-1. Whether a particular gradient is sharp or not may be based on a comparison with one or more thresholds.

In block 262d-5, the characteristics identified in block 262d-1 may be compared with known attributes (as represented by the data in the data storage 212a). To continue the above example, the height of the object 204c-1 identified as part of block 262d-1 may indicate that the object 204c-1 is likely a pole. The characteristics of the image described above in terms of, e.g., sharpness of gradient may be compared with known characteristics in relation to the same to identify, e.g., one or more dimensions, materials, equipment, signage, traffic signals, etc., with a given likelihood/ probability. One or more scores may be generated as part of block 262d-5 to indicate the extent/degree to which the comparison yields a match (e.g., an exact match, a substantial match, a lack of a match, etc.).

As described above, the comparison of block 262d-5 may yield a determination of whether a match exists (e.g., an exact match or a match in an amount greater than a threshold) in block 262d-7. If so (e.g., the "yes" path is taken from block 262d-7), flow may proceed to block 262d-9; otherwise (e.g., the "no" path is taken from block 262d-7), flow may proceed to block 262d-11. In block 262d-11, the characteristics of the objects may be ignored and/or subjected to additional processing as needed/desired.

In block 262d-9, the attributes represented in the data of the data storage 212a may be identified/declared as corresponding to the characteristics identified in block 262d-1. As part of block 262d-9, the attributes may be appended to a profile for the object 204c-1 (where the profile for the object 204c-1 may be stored as data in, e.g., the data storage 208a as set forth above).

While the processing of block 262a (e.g., the execution of the method 262d) was described above in relation to the object 204c-1 (or, analogously, the bounding region 208c-1), the processing/execution may be applied in respect of the object 204c-2 (or, analogously, the bounding region 208c-2). For example, the processing/execution as applied to the object 204c-2 may serve to identify the attachment mechanism 212c-2 and a power-head 216c-2.

The power-head 216c-2 may correspond to a section of the object 204c-2 that may be reserved for power/electrical equipment (e.g., a transformer) as provided by a power/ electrical generating operator/service provider. In this respect, a resource that may be deployed/mounted to the object 204c-2 may be required to maintain a sufficient (e.g., minimum) clearance relative to the power-head 216c-2. In some instances, the inclusion of the power-head 216c-2 may even eliminate the object 204c-2 from serving as a candidate for receiving the resource.

Having identified the candidate objects in conjunction with block 258a, and having identified attributes associated with the candidate objects in conjunction with block 262a, additional processing may be performed as represented by block 266a. The processing of block 266a may be performed in accordance with one or more algorithms. The processing/ algorithms of block 266a may incorporate aspects of ML, AI, and/or DL. The processing of block 266a may serve to select one or more mounting/mount objects to receive the resource(s), in accordance with data contained within/stored by a data storage 216a. The data storage 216a may correspond to the data storage 208a and/or the data storage 212a, which is to say that a common housing/storage device may be used in some embodiments.

The data of the data storage 216a may include/identify restrictions/limitations in respect of one or more of the candidate objects and/or one or more of the attributes associated therewith. For example, and as described above, the power-head 216c-2 associated with the object 204c-2 may represent a restriction in terms of where on the object 204c-2 the resource may be located (if at all). Similarly, the data of the data storage 216a may include/identify preferences in respect of one or more of the candidate objects and/or one or more of the attributes associated therewith. Such preferences may be specified in accordance with one or more terms/conditions. For example, a preference may be established on the basis of a technical specification/value (e.g., maintaining/reducing signal interference in a communication system in/to an amount less than a threshold), a business goal/objective (e.g., generate at least 'X' amount of revenue/profit per quarter), etc. The restrictions/limitations and/or preferences may be established by one or more entities, such as for example a given jurisdiction, a governmental entity (e.g., a local or regional board of officials), a private party, etc.

Once the object(s) for receiving the resource(s) are selected from the pool of candidate objects, the processing of block 266a may cause the resource(s) to be deployed on/about the selected objects. For example, as part of block 266a, directions may be generated and presented in conjunction with a presentation device (e.g., a display device, a speaker, a print-out, etc.). The directions may advise a technician/operator of a geographical location where the selected object(s) is/are located relative to a current location of the technician/operator (e.g., driving directions to a site of the selected object(s) may be provided). The directions may identify a resource (e.g., resource 200e of FIG. 2E) by a part number. The directions may provide an indication (e.g., a visual indication) of where the resource is to be placed on/about the selected object(s), potentially in accordance with the attributes identified as part of block 262a. In some embodiments, the directions may include a video tutorial.

The deployment of the resource(s) about the object(s) in conjunction with block 266a may result in attributes of the resource(s) being appended to one or more profiles for the object(s).

Figure 2E:
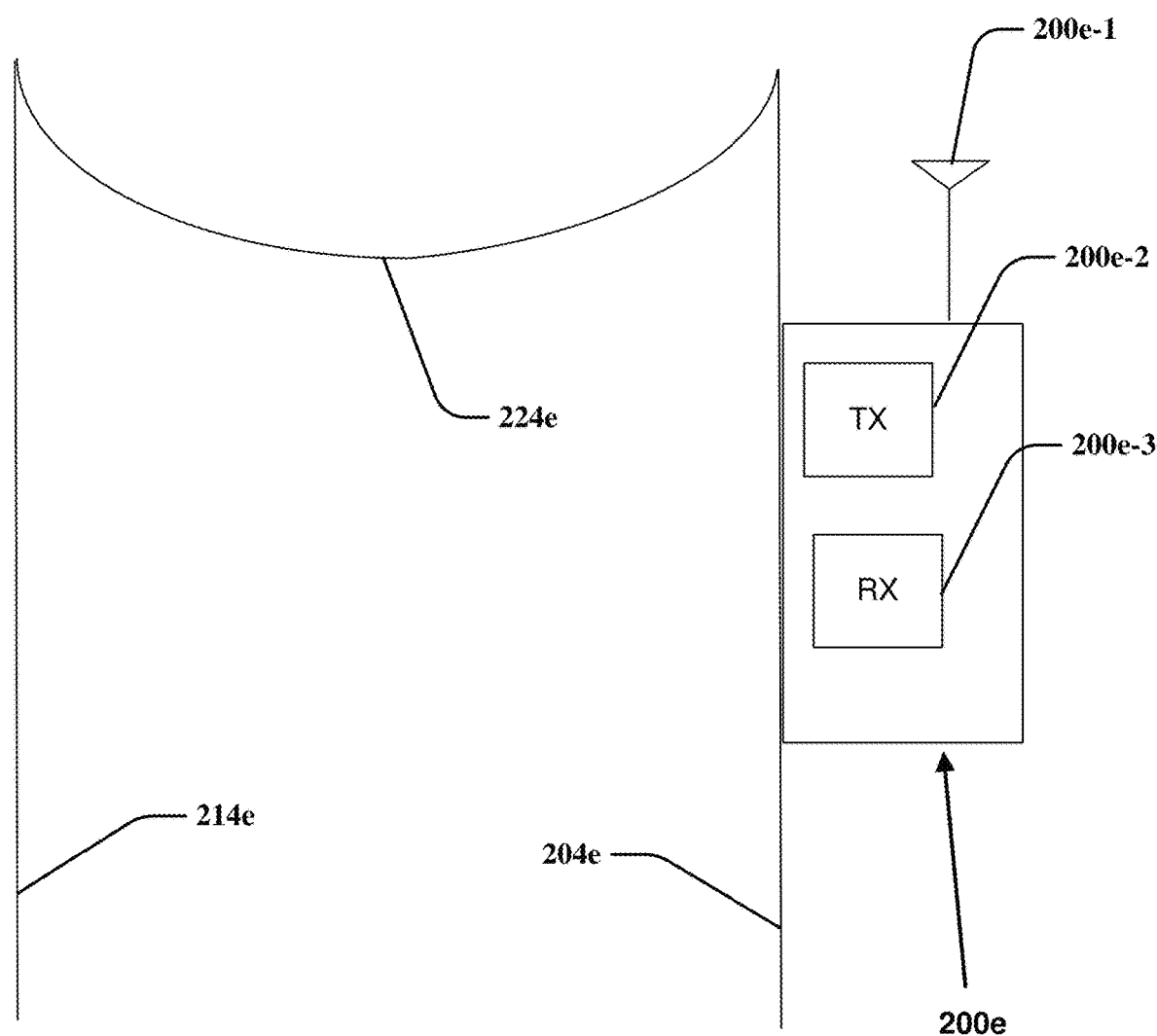
FIG. 2E depicts a deployment of a resource about an object in accordance with various aspects described herein.

Referring to FIG. 2E, a network resource 200e is shown as being placed on/about an object 204e (where the object 204e may correspond to one of the objects 204c-1 through 204c-2 of FIG. 2C). In an illustrative embodiment, the object 204e may correspond to a utility pole coupled to a second utility pole 214e via a transmission medium 224e. In the example of FIG. 2E, the resource 200e may include an antenna 200e-1, a transmitter (TX) 200e-2, and/or a receiver 200e-3. Other types of resources may be deployed as part of, e.g., block 266a of FIG. 2A in some embodiments.

While for purposes of simplicity of explanation, the respective methodological operations/processes are shown and described as a series of blocks in FIGS. 2A, 2B, and 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

In some embodiments, aspects of the methods described herein may be executed iteratively/repeatedly. To demonstrate, while aspects of an implementation of the system 200a (e.g., the processing associated with the blocks 258a and 262a) were described above as implementing a two-stage filter, in some embodiments additional stages may be included/incorporated. For example, if based on an initial analysis it is unclear whether a given (candidate) object of a particular type/kind is included in an image (see FIG. 2A: block 258a; see also FIG. 2B: blocks 258b-7 and blocks 258b-11), additional images may be requested/obtained in an effort to clarify the state of the given (candidate) object. As another example, if a particular attribute of interest is identified in relation to a (candidate) object (see FIG. 2A: block 262a; see also FIG. 2D), additional bounding boxes may be generated/defined to focus analysis on that attribute. In this respect, analyses of objects and/or attributes may occur in accordance with various levels of detail/specificity.

In some embodiments, aspects of the disclosure may provide for a detection/identification of objects or attributes using one or more neural networks. For example, one or more convolutional neural networks may be incorporated to identify objects or attributes.

Aspects of the disclosure may be used to streamline the development, deployment, and/or maintenance of a network (e.g., a communication network). For example, aspects of the disclosure may reduce (e.g., minimize) the number of site visits that may be required of technicians to determine whether objects are present at a given location, and if so, whether those objects are suitable candidates for receiving/deploying a resource. Still further, aspects of the disclosure may be used to identify opportunities (e.g., locations/objects) for a deployment of resources that otherwise may have been overlooked/missed.

Aspects of the disclosure may leverage pre-existing image capture equipment (e.g., image capture equipment 204a of FIG. 2A) and/or images (e.g., images 254a of FIG. 2A) (which may be stored in, and may be accessible via, one or more data stores) to identify and/or select one or more locations/objects for receiving network resources (e.g., network infrastructure). Stated slightly differently, aspects of this disclosure may be facilitated via a use of legacy/pre-existing equipment (which may initially have been deployed for reasons unrelated to network resource deployment/management), such that aspects of the disclosure may be implemented with little-to-no additional cost/overhead.

Aspects of the disclosure may be used to enrich a database of data regarding locations/objects for receiving network resources. In some embodiments, locations/objects that have demonstrated poor performance (e.g., performance that is less than a metric/threshold) may be removed/banned from serving as a candidate location/object in future deployments/implementations. In this respect, a log/history of locations/objects may assist a network/service operator/provider from incurring costly mistakes/rework.

In some embodiments, models (e.g., communication system/network models) may be executed/exercised to identify/assess a prospective performance of network resources when deployed/implemented at a given location/object. While aspects of such model execution may provide insight into the performance of a specific network resource at the given location, the execution of the model may also identify the impact of one or more operations of the resource on other resources (at the same location and/or at other locations). For example, while a first resource may operate/function as intended at a first location, the first resource may negatively impact (e.g., may cause signal/message/communication interference in relation to) a second resource (at the first location or at a second location). In this regard, an execution of one or more models may assist engineers/technicians in identifying an impact of a deployment of a first resource on one or more additional resources. In this respect, aspects of the disclosure may facilitate a decision-making procedure at both the device/component level and the system/network level. The models may be modified in accordance with a deployment of one or more resources, thereby resulting in modified models.

Aspects of this disclosure may facilitate an identification/selection of objects or locations for receiving/placing/mounting resources. Additionally, aspects of the disclosure may facilitate a maintenance of such objects, locations, and/or resources by proactively identifying when such maintenance should be performed (e.g., relative to a probability of inoperability of a resource exceeding a threshold), as well as identifying equipment and/or personnel needed to perform such maintenance. For example, in relation to the resource 200e of FIG. 2E, a frequency band of communication associated with a transmitter (e.g., TX 200e-2) may be adjusted to account for an aging/drift of a first oscillator of the transmitter over time. A technician may be dispatched to the site of the transmitter if, e.g., the first oscillator needs to be replaced. The technician may be instructed to bring a second/replacement oscillator.

Aspects of the disclosure may be used to recommend and/or identify/select one or more operating parameters (e.g., a transmission power level, a frequency band, a modulation/demodulation scheme, an encoding/decoding scheme, an encryption/decryption scheme) of a network resource(s). The operating parameter(s) may be selected based on an identification of one or more objects and/or one or more attributes as identified in accordance with various aspects of this disclosure.

In accordance with aspects of the disclosure, a selection of one or more objects to receive a deployment of one or more resources may be based on data associated with a communication system. For example, such data may be obtained and analyzed as part of the selection. The data may refer to at least one signal quality parameter/metric, such as for example a received signal strength, interference, noise, or any combination thereof.

Aspects of the disclosure may facilitate a selection of an object to receive a deployment of a resource in accordance with one or more attributes. For example, an object having/possessing a given attribute may make it more likely that the object will receive the deployment of the resource than if the object did not possess the given attribute. In this regard, aspects of the disclosure may identify attributes that an object has, as well as identify attributes that an object lacks.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200a, method 258b, and method 262d presented in FIGS. 1, 2A, 2B, and 2D. For example, virtualized communication network 300 can facilitate in whole or in part obtaining an image that is sourced from a vehicle, identifying a first plurality of characteristics in the image, comparing the first plurality of characteristics to a second plurality of characteristics associated with a plurality of objects to generate a first score, determining that a first match exists based on a comparison of the first score to a first threshold, responsive to the determining that the first match exists, identifying a first object of the plurality of objects as being present in the image, identifying a third plurality of characteristics in the image based on a processing of the image in accordance with a first bounding region that surrounds the first object in the image, comparing the third plurality of characteristics to a plurality of attributes to generate a second score, determining that a second match exists based on a comparison of the second score to a second threshold, responsive to the determining that the second match exists, identifying a first attribute of the plurality of attributes as being present in the first object, and selecting the first object or a second object of the plurality of objects to receive a deployment of a communication network resource in accordance with the identifying of the first object and the identifying of the first attribute. Virtualized communication network 300 can facilitate in whole or in part obtaining a first plurality of images, identifying a first plurality of characteristics in the first plurality of images, determining that a first match exists based on a comparison of the first plurality of characteristics to a second plurality of characteristics associated with a plurality of objects, responsive to the determining that the first match exists, identifying a first object, a second object, or a combination thereof, as being present in the first plurality of images, resulting in at least one identified object, identifying a third plurality of characteristics in the first plurality of images based on a processing of the first plurality of images in accordance with a bounding region that at least partially surrounds the at least one identified object, determining that a second match exists based on a comparison of the third plurality of characteristics to a plurality of attributes, responsive to the determining that the second match exists, identifying a first attribute of the plurality of attributes as being present in the at least one identified object, and selecting the at least one identified object to receive a deployment of a first resource in accordance with the identifying of the at least one identified object and the identifying of the first attribute. Virtualized communication network 300 can facilitate in whole or in part determining that a first instance of a first object is present in a first image in accordance with an execution of a first image processing algorithm, responsive to the determining that the first instance of the first object is present in the first image, generating a first bounding region that at least partially surrounds the first instance of the first object in the first image, determining that the first instance of the first object in the first image has a first attribute in accordance with an execution of a second image processing algorithm, wherein the second image processing algorithm is operative on the first image in accordance with the first bounding region, and selecting the first instance of the first object, a second instance of the first object, or a combination thereof, to receive a deployment of a network resource in accordance with the determining that the first instance of the first object in the first image has the first attribute.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributors and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
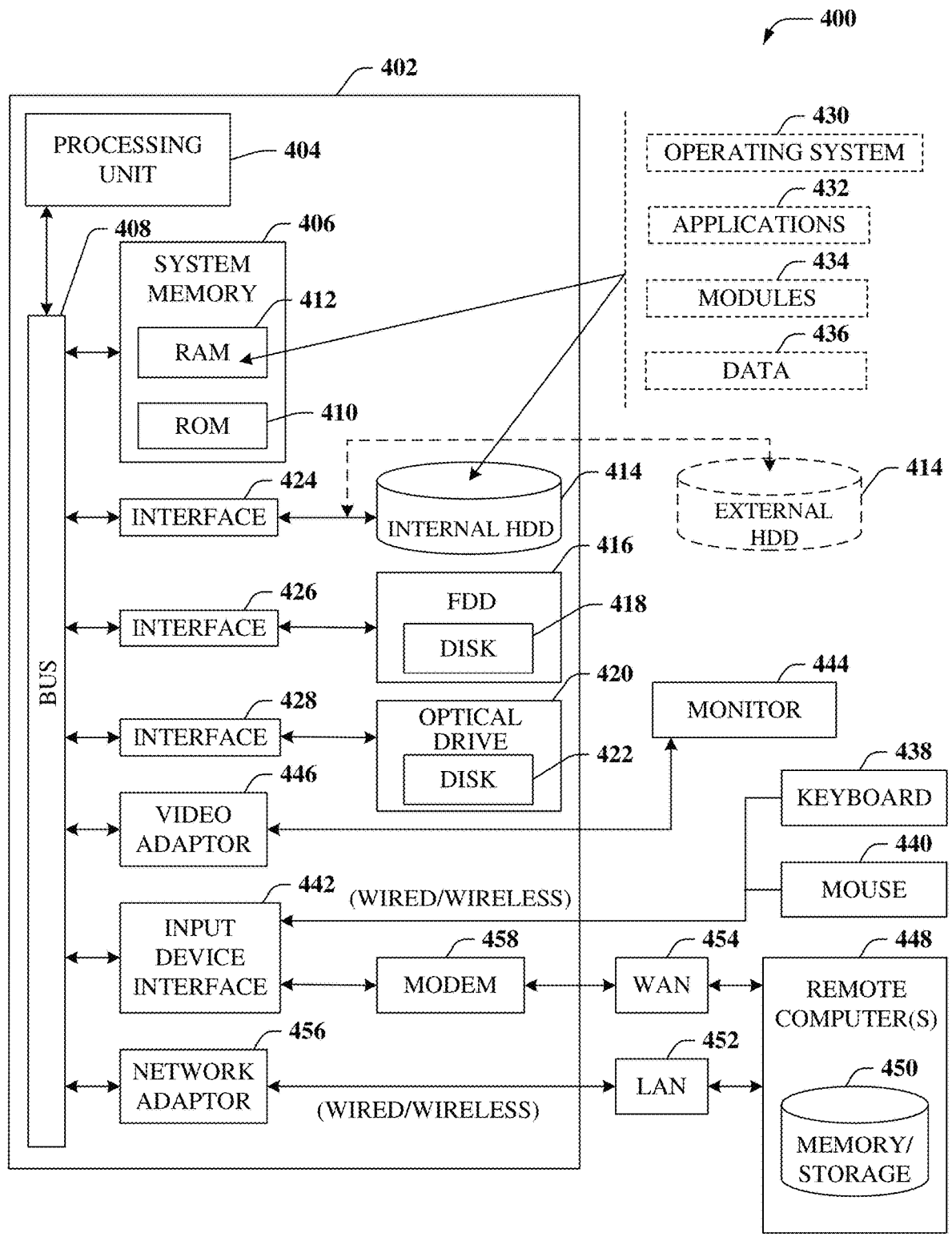
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining an image that is sourced from a vehicle, identifying a first plurality of characteristics in the image, comparing the first plurality of characteristics to a second plurality of characteristics associated with a plurality of objects to generate a first score, determining that a first match exists based on a comparison of the first score to a first threshold, responsive to the determining that the first match exists, identifying a first object of the plurality of objects as being present in the image, identifying a third plurality of characteristics in the image based on a processing of the image in accordance with a first bounding region that surrounds the first object in the image, comparing the third plurality of characteristics to a plurality of attributes to generate a second score, determining that a second match exists based on a comparison of the second score to a second threshold, responsive to the determining that the second match exists, identifying a first attribute of the plurality of attributes as being present in the first object, and selecting the first object or a second object of the plurality of objects to receive a deployment of a communication network resource in accordance with the identifying of the first object and the identifying of the first attribute. Computing environment 400 can facilitate in whole or in part obtaining a first plurality of images, identifying a first plurality of characteristics in the first plurality of images, determining that a first match exists based on a comparison of the first plurality of characteristics to a second plurality of characteristics associated with a plurality of objects, responsive to the determining that the first match exists, identifying a first object, a second object, or a combination thereof, as being present in the first plurality of images, resulting in at least one identified object, identifying a third plurality of characteristics in the first plurality of images based on a processing of the first plurality of images in accordance with a bounding region that at least partially surrounds the at least one identified object, determining that a second match exists based on a comparison of the third plurality of characteristics to a plurality of attributes, responsive to the determining that the second match exists, identifying a first attribute of the plurality of attributes as being present in the at least one identified object, and selecting the at least one identified object to receive a deployment of a first resource in accordance with the identifying of the at least one identified object and the identifying of the first attribute. Computing environment 400 can facilitate in whole or in part determining that a first instance of a first object is present in a first image in accordance with an execution of a first image processing algorithm, responsive to the determining that the first instance of the first object is present in the first image, generating a first bounding region that at least partially surrounds the first instance of the first object in the first image, determining that the first instance of the first object in the first image has a first attribute in accordance with an execution of a second image processing algorithm, wherein the second image processing algorithm is operative on the first image in accordance with the first bounding region, and selecting the first instance of the first object, a second instance of the first object, or a combination thereof, to receive a deployment of a network resource in accordance with the determining that the first instance of the first object in the first image has the first attribute.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
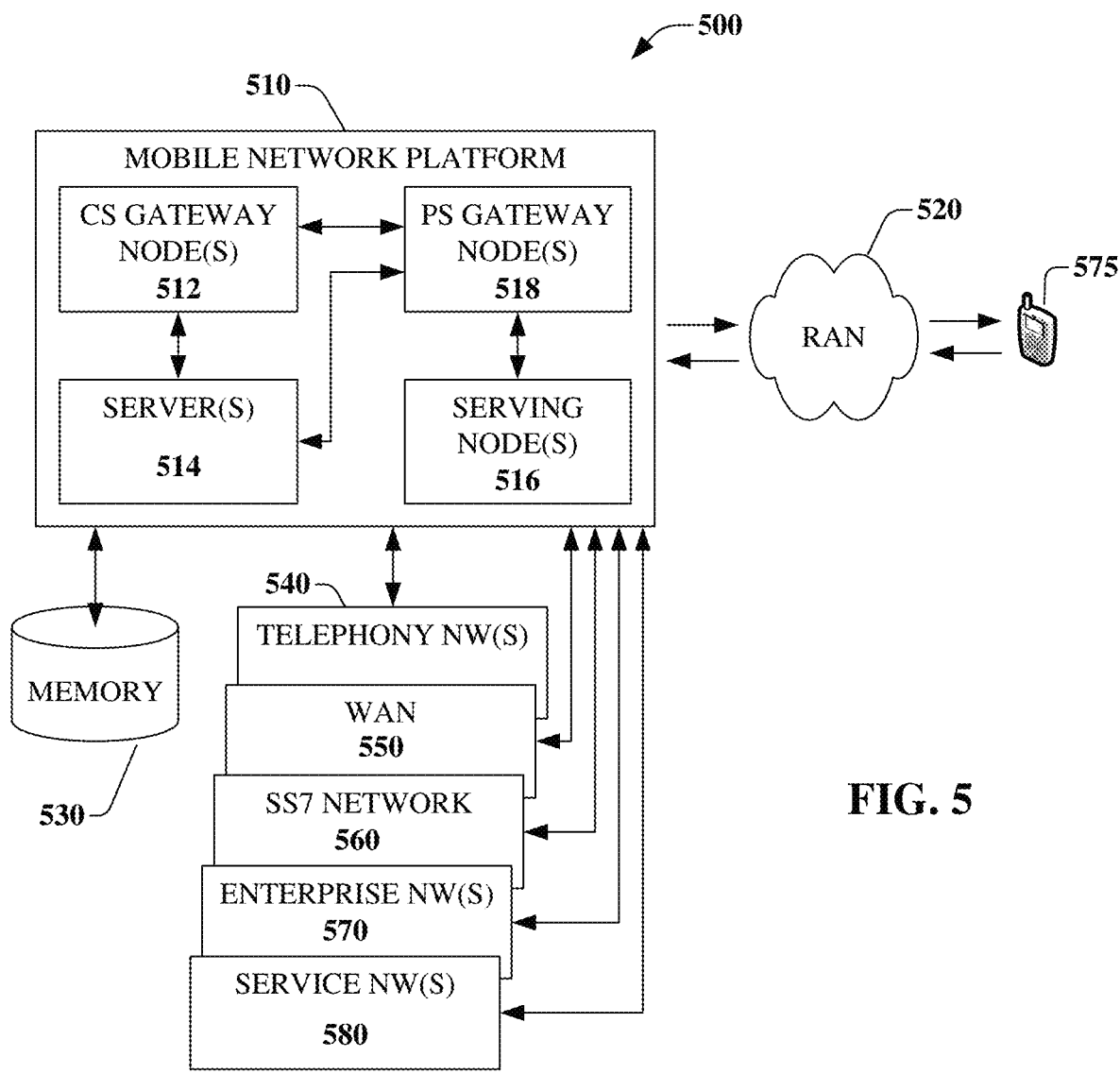
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining an image that is sourced from a vehicle, identifying a first plurality of characteristics in the image, comparing the first plurality of characteristics to a second plurality of characteristics associated with a plurality of objects to generate a first score, determining that a first match exists based on a comparison of the first score to a first threshold, responsive to the determining that the first match exists, identifying a first object of the plurality of objects as being present in the image, identifying a third plurality of characteristics in the image based on a processing of the image in accordance with a first bounding region that surrounds the first object in the image, comparing the third plurality of characteristics to a plurality of attributes to generate a second score, determining that a second match exists based on a comparison of the second score to a second threshold, responsive to the determining that the second match exists, identifying a first attribute of the plurality of attributes as being present in the first object, and selecting the first object or a second object of the plurality of objects to receive a deployment of a communication network resource in accordance with the identifying of the first object and the identifying of the first attribute. Platform 510 can facilitate in whole or in part obtaining a first plurality of images, identifying a first plurality of characteristics in the first plurality of images, determining that a first match exists based on a comparison of the first plurality of characteristics to a second plurality of characteristics associated with a plurality of objects, responsive to the determining that the first match exists, identifying a first object, a second object, or a combination thereof, as being present in the first plurality of images, resulting in at least one identified object, identifying a third plurality of characteristics in the first plurality of images based on a processing of the first plurality of images in accordance with a bounding region that at least partially surrounds the at least one identified object, determining that a second match exists based on a comparison of the third plurality of characteristics to a plurality of attributes, responsive to the determining that the second match exists, identifying a first attribute of the plurality of attributes as being present in the at least one identified object, and selecting the at least one identified object to receive a deployment of a first resource in accordance with the identifying of the at least one identified object and the identifying of the first attribute. Platform 510 can facilitate in whole or in part determining that a first instance of a first object is present in a first image in accordance with an execution of a first image processing algorithm, responsive to the determining that the first instance of the first object is present in the first image, generating a first bounding region that at least partially surrounds the first instance of the first object in the first image, determining that the first instance of the first object in the first image has a first attribute in accordance with an execution of a second image processing algorithm, wherein the second image processing algorithm is operative on the first image in accordance with the first bounding region, and selecting the first instance of the first object, a second instance of the first object, or a combination thereof, to receive a deployment of a network resource in accordance with the determining that the first instance of the first object in the first image has the first attribute.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
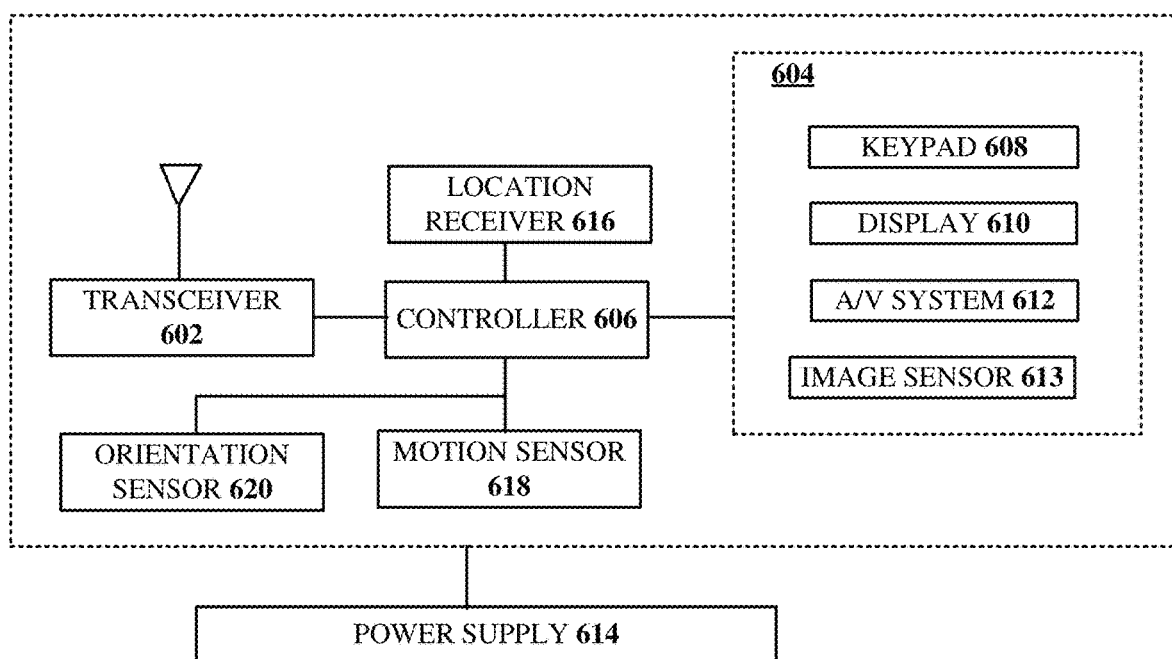
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining an image that is sourced from a vehicle, identifying a first plurality of characteristics in the image, comparing the first plurality of characteristics to a second plurality of characteristics associated with a plurality of objects to generate a first score, determining that a first match exists based on a comparison of the first score to a first threshold, responsive to the determining that the first match exists, identifying a first object of the plurality of objects as being present in the image, identifying a third plurality of characteristics in the image based on a processing of the image in accordance with a first bounding region that surrounds the first object in the image, comparing the third plurality of characteristics to a plurality of attributes to generate a second score, determining that a second match exists based on a comparison of the second score to a second threshold, responsive to the determining that the second match exists, identifying a first attribute of the plurality of attributes as being present in the first object, and selecting the first object or a second object of the plurality of objects to receive a deployment of a communication network resource in accordance with the identifying of the first object and the identifying of the first attribute. Computing device 600 can facilitate in whole or in part obtaining a first plurality of images, identifying a first plurality of characteristics in the first plurality of images, determining that a first match exists based on a comparison of the first plurality of characteristics to a second plurality of characteristics associated with a plurality of objects, responsive to the determining that the first match exists, identifying a first object, a second object, or a combination thereof, as being present in the first plurality of images, resulting in at least one identified object, identifying a third plurality of characteristics in the first plurality of images based on a processing of the first plurality of images in accordance with a bounding region that at least partially surrounds the at least one identified object, determining that a second match exists based on a comparison of the third plurality of characteristics to a plurality of attributes, responsive to the determining that the second match exists, identifying a first attribute of the plurality of attributes as being present in the at least one identified object, and selecting the at least one identified object to receive a deployment of a first resource in accordance with the identifying of the at least one identified object and the identifying of the first attribute. Computing device 600 can facilitate in whole or in part determining that a first instance of a first object is present in a first image in accordance with an execution of a first image processing algorithm, responsive to the determining that the first instance of the first object is present in the first image, generating a first bounding region that at least partially surrounds the first instance of the first object in the first image, determining that the first instance of the first object in the first image has a first attribute in accordance with an execution of a second image processing algorithm, wherein the second image processing algorithm is operative on the first image in accordance with the first bounding region, and selecting the first instance of the first object, a second instance of the first object, or a combination thereof, to receive a deployment of a network resource in accordance with the determining that the first instance of the first object in the first image has the first attribute.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
obtaining an image that is sourced from a vehicle;
identifying a first plurality of characteristics in the image;
comparing the first plurality of characteristics to a second plurality of characteristics associated with a plurality of objects to generate a first score;

determining that a first match exists based on a comparison of the first score to a first threshold;
responsive to the determining that the first match exists, identifying a first object of the plurality of objects as being present in the image;
identifying a third plurality of characteristics in the image based on a processing of the image in accordance with a first bounding region that surrounds the first object in the image;
comparing the third plurality of characteristics to a plurality of attributes to generate a second score;
determining that a second match exists based on a comparison of the second score to a second threshold;
responsive to the determining that the second match exists, identifying a first attribute of the plurality of attributes as being present in the first object; and
selecting the first object or a second object of the plurality of objects to receive a deployment of a communication network resource in accordance with the identifying of the first object and the identifying of the first attribute.

2. The device of claim 1, wherein the communication network resource comprises a transmitter, a receiver, and an antenna.

3. The device of claim 1, wherein the image is sourced from a first image captured by a fixed-wing aircraft and a second image captured by a satellite, and wherein the image comprises a composite of the first image and the second image.

4. The device of claim 1, wherein the plurality of objects comprises a streetlight, a utility pole, an ornate pole, a tower, and a structure of a building.

5. The device of claim 1, wherein the plurality of attributes comprises a dimension, a material, a utility equipment, a road sign, a traffic signal, and an attachment mechanism.

6. The device of claim 1, wherein the operations further comprise:
responsive to the determining that the first match exists, identifying the second object as being present in the image.

7. The device of claim 6, wherein the operations further comprise:
identifying a fourth plurality of characteristics in the image based on a processing of the image in accordance with a second bounding region that surrounds the second object in the image;
comparing the fourth plurality of characteristics to the plurality of attributes to generate a third score;
determining that a third match exists based on a comparison of the third score to a third threshold; and
responsive to the determining that the third match exists, identifying a second attribute of the plurality of attributes as being present in the second object,
wherein the selecting of the first object or the second object to receive the deployment of a communication network resource is further in accordance with the identifying of the second object and the identifying of the second attribute.

8. The device of claim 1, wherein the operations further comprise:
scheduling a maintenance activity with respect to at least one of the first object, the second object, the communication network resource, or a combination thereof, in accordance with the first attribute, wherein the scheduling comprises an identification of personnel to perform the maintenance activity and equipment needed to perform the maintenance activity.

9. The device of claim 1, wherein the operations further comprise:
selecting an operating parameter for the communication network resource in accordance with the first attribute.

10. The device of claim 9, wherein the operating parameter comprises a transmission power level, a frequency band, a modulation scheme, a demodulation scheme, an encoding scheme, a decoding scheme, an encryption scheme, a decryption scheme, or a combination thereof.

11. The device of claim 1, wherein the operations further comprise:
generating and presenting directions for the deployment of the communication network resource about the first object or the second object, wherein the directions comprise driving directions to a geographical location where the first object or the second object is located, an identification of the communication network resource by a part number, and a video tutorial that includes an indication of where the communication network resource is to be mounted about the first object or the second object.

12. The device of claim 1, wherein the selecting of the first object or the second object to receive the deployment of the communication network resource is further in accordance with a specification of a restriction imposed by a jurisdiction, a governmental entity, or a private party in respect of a placement of the communication network resource about the first object or the second object.

13. A non-transitory machine-readable medium, comprising executable instructions that, when executed by a processing system including a processor, facilitate performance of operations, the operations comprising:
obtaining a first plurality of images;
identifying a first plurality of characteristics in the first plurality of images;
determining that a first match exists based on a comparison of the first plurality of characteristics to a second plurality of characteristics associated with a plurality of objects;
responsive to the determining that the first match exists, identifying a first object, a second object, or a combination thereof, as being present in the first plurality of images, resulting in at least one identified object;
identifying a third plurality of characteristics in the first plurality of images based on a processing of the first plurality of images in accordance with a bounding region that at least partially surrounds the at least one identified object;
determining that a second match exists based on a comparison of the third plurality of characteristics to a plurality of attributes;
responsive to the determining that the second match exists, identifying a first attribute of the plurality of attributes as being present in the at least one identified object; and
selecting the at least one identified object to receive a deployment of a first resource in accordance with the identifying of the at least one identified object and the identifying of the first attribute.

14. The non-transitory machine-readable medium of claim 13, wherein the first attribute comprises a geographical location of the at least one identified object, and wherein the at least one identified object comprises a streetlight, a utility pole, an ornate pole, a tower, a structure of a building, or any combination thereof.

15. The non-transitory machine-readable medium of claim 13, wherein the first resource is associated with a communication system, wherein the first resource comprises an antenna, a transmitter, a receiver, or any combination thereof, and wherein the operations further comprise:

obtaining data associated with at least one signal quality parameter of the communication system, wherein the at least one signal quality parameter refers to a received signal strength, interference, noise, or any combination thereof, wherein the selecting of the at least one identified object to receive the deployment of the first resource is further in accordance with an analysis of the data.

16. The non-transitory machine-readable medium of claim 15, wherein the operations further comprise:

modifying a model of the communication system subsequent to the deployment of the first resource about the at least one identified object to generate a modified model, wherein the modified model is based on an operating parameter of the first resource;

obtaining a second plurality of images subsequent to the modifying of the model;

identifying a third object included in the second plurality of images via an application of the second plurality of images to the modified model;

identifying a second attribute of the plurality of attributes associated with the third object responsive to the identifying of the third object;

selecting the first object, the second object, or the third object for receiving a second resource responsive to the identifying of the second attribute associated with the third object, resulting in a selected object for the second resource; and presenting an indication of the selected object for the second resource on a presentation device.

17. The non-transitory machine-readable medium of claim 13, wherein the selecting of the at least one identified object to receive the deployment of the first resource is further in accordance with a specification of a restriction imposed by a jurisdiction, a governmental entity, a private party, or any combination thereof, in respect of a placement of the first resource about a third object.

18. A method, comprising:

determining, by a processing system including a processor, that a first instance of a first object is present in a first image in accordance with an execution of a first image processing algorithm;

responsive to the determining that the first instance of the first object is present in the first image, generating, by the processing system, a first bounding region that at least partially surrounds the first instance of the first object in the first image;

determining, by the processing system, that the first instance of the first object in the first image has a first attribute in accordance with an execution of a second image processing algorithm, wherein the second image processing algorithm is operative on the first image in accordance with the first bounding region;

determining, by the processing system, that a second instance of the first object is present in the first image, a second image, or a combination thereof, wherein the second instance of the first object is different from the first instance of the first object;

responsive to the determining that the second instance of the first object is present in the first image, the second image, or the combination thereof, generating, by the processing system, a second bounding region that at least partially surrounds the second instance of the first object in the first image, the second image, or the combination thereof;

responsive to the generating of the second bounding region, determining, by the processing system, that the second instance of the first object has a second attribute that is different from the first attribute in accordance with the execution of the second image processing algorithm operative on the first image, the second image, or the combination thereof; and selecting, by the processing system, the first instance of the first object, the second instance of the first object, or a combination thereof, to receive a deployment of a network resource in accordance with the determining that the first instance of the first object in the first image has the first attribute and in accordance with the determining that the second instance of the first object has the second attribute.

19. The method of claim 18, further comprising:

determining, by the processing system, that the second instance of the first object does not have the first attribute in accordance with the execution of the second image processing algorithm operative on the first image, the second image, or the combination thereof, wherein the selecting of the first instance of the first object, the second instance of the first object, or the combination thereof, to receive the deployment of the network resource is further in accordance with the determining that the second instance of the first object does not have the first attribute.

20. The method of claim 18, further comprising:

appending, by the processing system, the first attribute to a profile for the first instance of the first object responsive to the determining that the first instance of the first object in the first image has the first attribute.

* * * * *